UNITED STATES PATENT OFFICE.

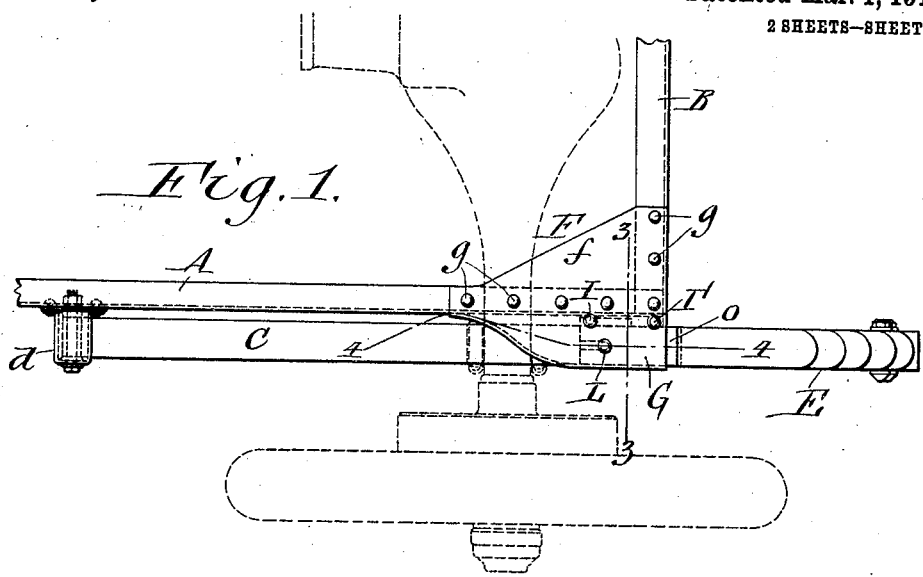

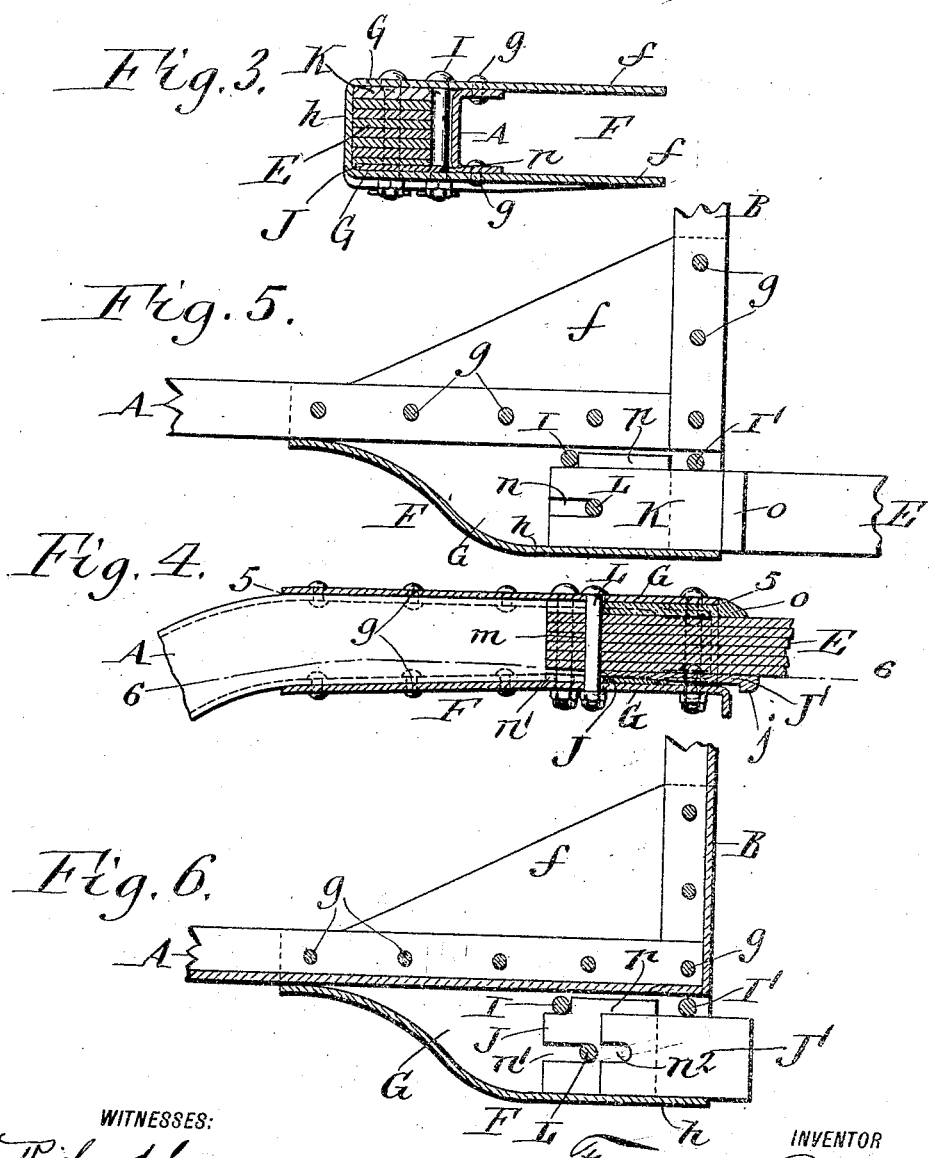

FREDERICK P. NEHRBAS, OF BUFFALO, NEW YORK, ASSIGNOR TO E. R. THOMAS MOTOR COMPANY, OF BUFFALO, NEW YORK, A CORPORATION OF NEW YORK.

AUTOMOBILE.

950,949.  Specification of Letters Patent.  Patented Mar. 1, 1910.

Application filed June 7, 1909. Serial No. 500,519.

*To all whom it may concern:*

Be it known that I, FREDERICK P. NEHRBAS, a citizen of the United States, residing at Buffalo, in the county of Erie and State of New York, have invented a new and useful Improvement in Automobiles, of which the following is a specification.

This invention relates to an improvement in the means for attaching three-quarter elliptical springs to the frame of an automobile and has the object to provide means for this purpose which will reliably connect the frame and springs, increase the strength of the frame and improve the appearance of the automobile, this end being accomplished at low cost and without any material departure from the general design heretofore in use.

In the accompanying drawings consisting of 2 sheets: Figure 1 is a top plan view of one of the rear corners of an automobile frame and the adjacent three-quarter elliptical spring showing the same connected by my improved means for this purpose. Fig. 2 is a side elevation thereof. Fig. 3 is a cross section, on an enlarged scale, in line 3—3, Fig. 1. Fig. 4 is a fragmentary vertical longitudinal section, on an enlarged scale, in line 4—4, Fig. 1. Figs. 5 and 6 are horizontal sections in the correspondingly numbered lines in Fig. 4.

Similar letters of reference indicate corresponding parts throughout the several views.

A represents one of the longitudinal side bars of the automobile frame and B the rear cross bar thereof, these bars lapping one over the other at their opposing ends forming a right angle corner, as shown by dotted lines in Fig. 4 and by full lines in Fig. 5. Adjacent to this corner is arranged a three-quarter elliptical spring which comprises a semi-elliptical lower section C connected with its central part to the adjacent wheel axle D while its front end is connected with the outer side of the frame side bar by a bracket $d$, and an upper quarter-elliptical section E which is connected at its rear end with the rear end of the lower section by means of a link $e$ while its front end is connected with the adjacent corner of the automobile frame by means of my improved connecting means which are constructed as follows:—F represents a bracket having upper and lower horizontal plates which are secured with their inner parts $f$ by rivets $g$ to the upper and lower sides of the end portions of the side and cross bars of the frame while their outer parts G are connected at their outer ends by a vertical longitudinal web or wall $h$. The inner parts $f$ of the bracket plates form gussets or braces which stiffen the connection between the side and cross bars at the corner thereof. The rear part of the vertical web $h$ is arranged a considerable distance beyond the outer side of the adjacent frame side bar while the front end thereof is fitted against this side of said bar forming a rearwardly flaring pocket or socket which is open at its rear end and closed at its front end. The front ends of the several superposed leaves of the upper quarter-elliptical spring section E are inserted forwardly into a pocket of the bracket F. The width of this pocket is somewhat greater than the width of the leaves of the upper spring section for the purpose of permitting the leaves in the upper section to be made as wide as those in the lower section and still separate the lower section from the side bar a sufficient distance to allow the lower section to move vertically without liability of contact with the side bar. To hold the leaves of the upper spring section against lateral movement in the socket, the outer edges of the same are engaged with the inner side of the vertical web or outer wall $h$ of this pocket while the inner edges thereof engage with a pair of upright bolts I, $I^1$ which connect the upper and lower plates of the bracket one behind the other between the frame side bar and the upper spring, as shown best in Figs. 1, 5 and 6. The upper spring leaves are securely held in the pocket against rearward withdrawal therefrom by means which comprise a pair of coöperating wedges J, $J^1$ arranged between the lower side of the pocket and the underside of the upper spring section and the upper spring is cushioned in this pocket by means of a filling or strip K of wood interposed between the top of this spring and the upper side of the pocket. The front wedge J, the leaves of the upper section and the cushion filling are held in the pocket by means of a coupling or clamping bolt L passing vertically through these parts and the upper and lower plates of the bracket and the rear wedge $J^1$ is adapted to be driven forwardly between the front wedge and the lowermost leaf of the upper spring section, the rear end of the rear wedge being provided with an enlargement $j$ to facilitate such driving and also permit convenient removal thereof if necessary for repairs. The leaves of the upper spring section are provided with openings $m$ for the reception of the clamping bolt L but the cushion filling, and the front and rear wedges are provided respectively with forwardly opening slots or notches $n$, $n^1$, $n^2$, in their front ends which receive this bolt and permit of more convenient assembling of the parts. The rear end of the filling is provided with a beveled enlargement $o$ which is flush with the top of the pocket and produces a neat and finished appearance. For the purpose of aiding in holding the front wedge against forward movement in the socket the same is provided on its inner side with a laterally projecting lug $p$ which engages with the front side bolt I, as shown in Figs. 3 and 6.

I claim as my invention:

1. An automobile comprising a longitudinal bar and a cross bar, a bracket having upper and lower plates which are secured with their inner parts to the adjacent ends of said bars and form gussets while their outer parts are connected by a vertical web and form a pocket, and a spring seated in said pocket.

2. An automobile comprising a longitudinal bar and a cross bar, a bracket having upper and lower plates which are secured with their inner parts to the adjacent ends of said bars and form gussets while their outer parts are connected by a vertical web which has its rear part separated from the longitudinal bar while its front part is closed to the same forming a rearwardly flaring pocket, and a spring seat in said pocket.

3. An automobile comprising a side bar and cross bar, a bracket connected with said bars and having a pocket, a spring arranged in said pocket and engaging with the outer side of the pocket, and a vertical bolt connecting the top and bottom of said bracket and arranged between the spring and the side bar.

4. An automobile comprising a frame, a bracket secured to the frame and having a pocket, a spring seated in the pocket, and a cushion filling arranged between one horizontal side of the pocket and the spring.

5. An automobile comprising a frame, a bracket secured to the frame and having a pocket, a spring seated in the pocket and a wedge arranged between one horizontal side of the pocket and the spring.

6. An automobile comprising a frame, a bracket secured to the frame and having a pocket, a spring seated in the pocket, a cushion filling arranged between one horizontal side of the pocket and the spring, and a wedge arranged between the other horizontal side of the pocket and the spring.

7. An automobile comprising a frame, a bracket secured to the frame and having a pocket, a spring seated in the pocket and two coöperating wedges arranged between one horizontal side of the pocket and the spring.

8. An automobile comprising a frame, a bracket secured to the frame and having a pocket, a spring seated in the pocket, and two coöperating wedges arranged between one horizontal side of the pocket and the spring, one of said wedges being stationary while the other is movable lengthwise for tightening the spring in the socket.

9. An automobile comprising a frame, a bracket secured to the frame and having a pocket, a spring seated in the pocket, a vertical bolt connecting the spring with the top and bottom of the pocket, and a cushion filling arranged between the spring and one of the horizontal sides of the pocket and having a longitudinal slot or recess at its front end which receives said bolt.

10. An automobile comprising a frame, a bracket secured to the frame and having a pocket, a spring seated in the pocket, a vertical bolt connecting the spring with the top and bottom of the pocket, a stationary wedge arranged between one horizontal wall of the pocket and the spring and having a longitudinal slot or recess in its front end which receives said bolt, and a movable wedge engaging with the stationary wedge.

11. An automobile comprising a frame, a bracket secured to the frame and having a pocket, a spring seated in the pocket, a vertical bolt connecting the spring with the top and bottom of the pocket, a side bolt connecting the top and bottom of the pocket between said spring and said side bar, a stationary wedge arranged between said spring and one horizontal wall of the pocket and having a lug on its side which engages with said side bolt, and a movable wedge engaging with the stationary wedge.

Witness my hand this 2nd day of June, 1909.

FREDERICK P. NEHRBAS.

Witnesses:
E. L. WATSON,
H. C. HARVEY.